United States Patent
Kwak et al.

(10) Patent No.: US 9,960,418 B2
(45) Date of Patent: May 1, 2018

(54) CATHODE ACTIVE MATERIAL, PREPARATION METHOD THEREOF, AND LITHIUM SECONDARY BATTERY COMPRISING THE SAME

(71) Applicant: LG Chem, Ltd., Seoul (KR)

(72) Inventors: Ick Soon Kwak, Daejeon (KR); Seung Beom Cho, Daejeon (KR); Hwa Seok Chae, Daejeon (KR); Yeo June Yoon, Daejeon (KR)

(73) Assignee: LG Chem, Ltd. (KR)

( * ) Notice: Subject to any disclaimer, the term of this patent is extended or adjusted under 35 U.S.C. 154(b) by 382 days.

(21) Appl. No.: 14/437,085

(22) PCT Filed: Oct. 31, 2014

(86) PCT No.: PCT/KR2014/010355
§ 371 (c)(1),
(2) Date: Apr. 20, 2015

(87) PCT Pub. No.: WO2015/065098
PCT Pub. Date: May 7, 2015

(65) Prior Publication Data
US 2016/0028077 A1    Jan. 28, 2016

(30) Foreign Application Priority Data
Oct. 31, 2013  (KR) .................. 10-2013-0131636

(51) Int. Cl.
*H01M 4/36*    (2006.01)
*H01M 4/505*   (2010.01)
(Continued)

(52) U.S. Cl.
CPC .......... *H01M 4/366* (2013.01); *H01M 4/131* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

2006/0194116 A1*  8/2006  Suzuki .................. H01M 2/166
                                                         429/251
2011/0262785 A1* 10/2011  Johnson .............. H01M 2/1077
                                                         429/66
(Continued)

FOREIGN PATENT DOCUMENTS

CA        2373756 A1    11/2000
CN      101308925 A     11/2008
(Continued)

OTHER PUBLICATIONS

Improved electrochemical performance of La0.7Sr0.3MnO3 and carbon co-coated LiFePO4 synthsized by freeze-drying process, Cui et al, Electrochimica Acta 55 (2010) 922-926.*
(Continued)

*Primary Examiner* — Scott J Chmielecki
(74) *Attorney, Agent, or Firm* — Lerner, David, Littenberg, Krumholz & Mentlik, LLP (57) ABSTRACT

Provided is a cathode active material including lithium transition metal oxide particles and composite particles, wherein the composite particles include any one selected from the group consisting of yttria stabilized zirconia (YSZ), gadolinia-doped ceria (GDC), lanthanum strontium gallate magnesite (LSGM), lanthanum strontium manganite (LSM), and nickel (Ni)—YSZ, or a mixture of two or more thereof, and the cathode active material includes the composite particles having a single-phase peak when analyzed by X-ray diffraction (XRD). A cathode active material according to an embodiment of the present invention may not only
(Continued)

minimize the reduction in capacity or output of a secondary battery, but may also further improve life characteristics.

37 Claims, 8 Drawing Sheets (51) Int. Cl.
| | |
|---|---|
| *H01M 4/525* | (2010.01) |
| *H01M 4/131* | (2010.01) |
| *H01M 4/62* | (2006.01) |
| *H01M 10/0525* | (2010.01) |
| *H01M 10/052* | (2010.01) |
| *H01M 4/02* | (2006.01) |

(52) U.S. Cl.
CPC ............ *H01M 4/62* (2013.01); *H01M 10/052* (2013.01); *H01M 10/0525* (2013.01); *H01M 2004/028* (2013.01); *H01M 2220/20* (2013.01); *H01M 2220/30* (2013.01); *Y02T 10/7011* (2013.01)

(56) References Cited

U.S. PATENT DOCUMENTS

| | | | |
|---|---|---|---|
| 2012/0189920 A1* | 7/2012 | Li | H01M 4/382 |
| | | | 429/331 |
| 2013/0101900 A1 | 4/2013 | Nagai | |
| 2013/0244102 A1* | 9/2013 | Golodnitsky | H01M 2/0202 |
| | | | 429/210 |
| 2013/0260256 A1* | 10/2013 | Kawanaka | H01M 4/386 |
| | | | 429/246 |
| 2013/0309564 A1* | 11/2013 | Yoshida | H01M 10/0525 |
| | | | 429/200 |
| 2014/0110641 A1 | 4/2014 | Murotani et al. | |
| 2014/0170494 A1 | 6/2014 | Paulsen et al. | |

FOREIGN PATENT DOCUMENTS

| | | |
|---|---|---|
| CN | 101567447 B | 7/2011 |
| CN | 103078109 A | 5/2013 |
| JP | H06171949 A | 6/1994 |
| JP | 2000235858 A | 8/2000 |
| JP | 2012138197 A | 7/2012 |
| JP | 2013182757 A | 9/2013 |
| KR | 10277796 B1 | 2/2001 |
| KR | 20070102113 A | 10/2007 |
| WO | 2012136473 A1 | 10/2012 |
| WO | 2012176901 A1 | 12/2012 |

OTHER PUBLICATIONS

Cui et al, Improved electrochemical performance La0.7Sr0.3MnO3 and carbon co-coated LiFePO4 synthesized by freeze-drying process, Electrochimica Acta 55 (2010) 922-926.*
Search Report from Office Action from Chinese Application No. 201480002932.8, dated Nov. 3, 2016.
Search Report from European Application No. 14853151.0, dated Dec. 1, 2016.
Fey, et al., "Thermal and electrochemical behavior of yttria-stabilized zirconia coated LiCoO2 during overcharge tests." Journal of Power Sources, vol. 189 (2009), pp. 837-840.
Extended European Search Report for Application No. EP14853151 dated Apr. 21, 2017.
Cui, Yan et al., "Improved electrochemical performance of La0.7Sr0.3MnO3 and carbon co-coated LiFePO4 synthesized by freeze-drying process", Electrochimica Acta, 2010, 55, 3, pp. 922-926.
International Search Report for Application No. PCT/KR2014/010355 dated Feb. 10, 2015.

* cited by examiner

CATHODE ACTIVE MATERIAL, PREPARATION METHOD THEREOF, AND LITHIUM SECONDARY BATTERY COMPRISING THE SAME

CROSS-REFERENCE TO RELATED APPLICATIONS

The present application is a national phase entry under 35 U.S.C. § 371 of International Application No. PCT/KR2014/010355 filed Oct. 31, 2014, which claims priority from Korean Application No. 10-2013-0131636 filed Oct. 31, 2013, all of which are hereby incorporated herein by reference.

TECHNICAL FIELD

The present invention relates to a cathode active material, a preparation method thereof, and a lithium secondary battery comprising the cathode active material.

BACKGROUND ART

Lithium secondary batteries have been widely used as power sources of portable devices after they have emerged as small, lightweight, and high-capacity batteries since 1991. Recently, in line with the rapid development of electronics, communications, and computer industries, camcorders, mobile phones, and notebook PCs have appeared and undergone continuous and remarkable development. Accordingly, the demand for lithium secondary batteries as a power source for driving these portable electronic information and communication devices has increased day by day.

Lithium secondary batteries have limitations in that their lifetime rapidly decreases as charge and discharge are repeated. In particular, the above limitations are more severe at high temperature. The reason for this is due to a phenomenon that occurs when an electrolyte is decomposed or an active material is degraded due to moisture in the battery or other effects, and the internal resistance of the battery increases.

Cathode active materials for a lithium secondary battery, which have been actively researched and developed, may include $LiNiO_2$, $LiMn_2O_4$, $LiFePO_4$, $Li(Ni_xCo_yMn_z)O_2$. However, with respect to $LiNiO_2$, the synthesis thereof may not only be difficult but there may also be limitations in thermal stability, and thus, commercialization is difficult. With respect to $LiMn_2O_4$, some have been commercialized as low-cost products, but life characteristics were poor due to structural distortion (Jahn-Teller distortion) caused by $Mn^{+3}$. Also, since $LiFePO_4$ is inexpensive and has excellent stability, a significant amount of research has currently been conducted for the application of $LiFePO_4$ for a hybrid electric vehicle (HEV). However, the application to other areas may be difficult due to low conductivity.

Thus, $Li(Ni_xCo_yMn_z)O_2$ is a material which is currently very much in the spot light as a cathode active material alternative to $LiCoO_2$. This material is less expensive than $LiCoO_2$ and may be used in high voltage and high capacity applications. However, $Li(Ni_xCo_yMn_z)O_2$ has limitations in that rate capability and life characteristics at high temperature may be poor. In order to address the above limitations, a significant amount of research, for example, has been conducted by a method of coating the surface of a cathode active material with a metal having good conductivity or a method of doping the cathode active material with a material such as aluminum (Al), magnesium (Mg), titanium (Ti), zirconium (Zr), tin (Sn), calcium (Ca), silver (Ag), and zinc (Zn). With respect to the coating, a wet method has been used, but actually it has a great limitation of increasing the cost in mass production. Currently, reports about the improvement of the properties of the above metal through dry doping tend to increase.

For example, Korean Patent No. 10-277796 discloses a technique of coating a cathode active material with a metal oxide by coating the surface of the cathode active material with a metal, such as Mg, Al, cobalt (Co), potassium (K), sodium (Na), or Ca, and heat treating the cathode active material in an oxidizing atmosphere.

However, limitations, such as the occurrence of cracks in the cathode active material and a reduction in capacity or output of a secondary battery, are difficult to be addressed. Therefore, a cathode active material, which may reduce side reactions between electrolyte and active material during charge and discharge, may minimize the reduction in the capacity or output of the secondary battery, and may improve life characteristics, is required.

PRIOR ART DOCUMENTS

Patent Document

Korean Patent No. 10-277796

DISCLOSURE OF THE INVENTION

Technical Problem

An aspect of the present invention provides a cathode active material which may improve life characteristics by not only minimizing a reduction in capacity or output but also by significantly reducing the occurrence of cracks in the cathode active material.

Another aspect of the present invention provides a method which may easily prepare a cathode active material including composite particles in the inside, outside, or both inside and outside of the cathode active material particles by controlling a heat treatment temperature and the amount of the composite particles (surface modifier).

Another aspect of the present invention provides a cathode including the cathode active material.

Another aspect of the present invention provides a lithium secondary battery including the cathode.

Technical Solution

According to an aspect of the present invention, there is provided a cathode active material including: lithium transition metal oxide particles; and composite particles, wherein the composite particles include any one selected from the group consisting of yttria stabilized zirconia (YSZ), gadolinia-doped ceria (GDC), lanthanum strontium gallate magnesite (LSGM), lanthanum strontium manganite (LSM), calcium (Ca)-doped zirconia or CaO-stabilized zirconia (CSZ), scandium (Sc)-doped zirconia (SSZ), and nickel (Ni)—YSZ, or a mixture of two or more thereof, and the composite particles have a single-phase peak when analyzed by X-ray diffraction (XRD).

According to another aspect of the present invention, there is provided a method of preparing a cathode active material including: mixing lithium transition metal oxide particles and composite particles and heat treating the mixture, wherein the composite particles include any one selected from the group consisting of yttria stabilized zirconia (YSZ), gadolinia-doped ceria (GDC), lanthanum strontium gallate magnesite (LSGM), lanthanum strontium manganite (LSM), calcium (Ca)-doped zirconia or calcia stabilized zirconia (CSZ), scandium (Sc)-doped zirconia (SSZ), and nickel (Ni)—YSZ, or a mixture of two or more thereof.

According to another aspect of the present invention, there is provided a cathode including the cathode active material.

According to another aspect of the present invention, there is provided a lithium secondary battery including the cathode.

Advantageous Effects

A cathode active material according to an embodiment of the present invention may minimize a reduction in capacity or output of a secondary battery by including lithium transition metal oxide particles and specific composite particles having a single phase. In addition, the occurrence of cracks in the cathode active material may be minimized because an impact absorbing effect may be obtained during cathode processing, particularly, pressing due to structural features of the composite particles. As a result, the cathode active material may further improve life characteristics when used in the secondary battery.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A cathode active material according to an embodiment of the present invention includes lithium transition metal oxide particles; and composite particles, wherein the composite particles include any one selected from the group consisting of yttria stabilized zirconia (YSZ), gadolinia-doped ceria (GDC), lanthanum strontium gallate magnesite (LSGM), lanthanum strontium manganite (LSM), calcium (Ca)-doped zirconia or CaO-stabilized zirconia (CSZ), scandium (Sc)-doped zirconia (SSZ), and nickel (Ni)—YSZ, or a mixture of two or more thereof, and the composite particles have a single-phase peak when analyzed by X-ray diffraction (XRD).

The cathode active material according to the embodiment of the present invention may minimize a reduction in capacity or output of a secondary battery by including lithium transition metal oxide particles and specific composite particles having a single phase. In addition, the occurrence of cracks in the cathode active material may be minimized because an impact absorbing effect may be obtained during cathode processing, particularly, pressing due to structural features of the composite particles. As a result, the cathode active material may further improve life characteristics when used in the secondary battery.

In the cathode active material according to the embodiment of the present invention, YSZ in the composite particles is yttria stabilized zirconia, wherein the yttria stabilized zirconia is a ceramic material which is stabilized even at room temperature by adding yttrium oxide (yttria) to zirconium oxide (zirconia). In the YSZ, since yttria is added to zirconia, a portion of $Zr^{4+}$ ions may be substituted with $Y^{3+}$. Accordingly, four $O^{2-}$ ions are replaced with three $O^{2-}$ ions and as a result, an oxygen vacancy may be formed. The YSZ may have $O^{2-}$ ion conductivity due to the oxygen vacancies thus formed, and the conductivity increases as the temperature increases. These features may be suitable for a solid oxide fuel cell (SOFC) operating at high temperature.

Also, in the cathode active material according to the embodiment of the present invention, since LSGM in the composite particles, as lanthanum-strontium-gallium-magnesium (LaSrGaMg) oxide, have high ionic conductivity, the LSGM is a material which may reduce an operating temperature of the solid oxide fuel cell.

In the cathode active material according to the embodiment of the present invention, GDC in the composite particles, as gadolium (Gd)-doped ceria, for example, may include $Gd_{0.1}Ce_{0.9}O_{1.95}$ and may have high ionic conductivity similar to LSGM.

Also, in the cathode active material according to the embodiment of the present invention, LSM in the composite particles has a manganese-based Perovskite structure, for example, a LaSrMnO or $La_{(1-x)}Sr_xMnO_3$ (0.01≤x≤0.30) Perovskite structure, almost does not have ionic conductivity, and has excellent electronic conductivity. The LSM may be $La_{1-x}Sr_xMn_yO_{3-\delta}$ (0.05≤x≤1)(0.95≤y≤1.15) (where δ is defined as a value representing a small deviation from perfect stoichiometry).

In the cathode active material according to the embodiment of the present invention, SSZ in the composite particles may be $(ZrO_2)_{1-2x}(Sc_2O_3)_x$, $(ZrO_2)_{1-2x}(Sc_2O_3)_{x-z}(Y_2O_3)_z$, or $(ZrO_2)_{1-2x-z}(Sc_2O_3)_x(CeO_2)_z$ (0<x≤0.25) (0<z≤0.1).

Furthermore, in the cathode active material according to the embodiment of the present invention, CSZ in the composite particles may be Ca-doped zirconia or calcia (CaO)-stabilized zirconia, and thermal stability of zirconia may be improved by adding calcia. The CSZ is in a state in which a cubic crystal structure and a tetragonal crystal structure are mixed. The tetragonal crystal structure changes into the cubic crystal structure when the temperature increases, and the cubic crystal structure again changes into the tetragonal crystal structure when the temperature decreases. Thus, volume expansion and contraction may be repeated during a process of changing the crystal structure as described above.

In the cathode active material according to the embodiment of the present invention, the composite particles, i.e., YSZ, GDC, LSGM, LSM, CSZ, SSZ, and Ni—YSZ, have a single phase.

In the cathode active material according to the embodiment of the present invention, the composite particles may include any one selected from the group consisting of zirconia-based materials, i.e., YSZ, CSZ, and SSZ, or a mixture of two or more thereof.

In particular, the YSZ may be $Zr_{(1-x)}Y_xO_{2-x/2}$, where 0.01≤x≤0.30, for example, 0.03≤x≤0.20.

Also, the SSZ, for example, may be $(ZrO_2)_{1-2x}(Sc_2O_3)_x$, $(ZrO_2)_{1-2x}(Sc_2O_3)_{x-z}(Y_2O_3)_z$, or $(ZrO_2)_{1-2x-z}(Sc_2O_3)_x(CeO_2)_z$ (0.01≤x≤0.2) (0.01≤z≤0.1).

Furthermore, the CSZ may include CaO in an amount of 2 wt % to 17 wt % based on a total weight of the CSZ.

A cathode active material according to a first embodiment of the present invention includes lithium transition metal oxide particles and composite particles, wherein the composite particles may be coated on outer surfaces of the lithium transition metal oxide particles to form a coating layer.

Specifically, for example, in the case that the composite particles are YSZ and the YSZ is included in the outer surface of the lithium transition metal oxide, yttrium (Y) may first form a single phase by occupying zirconium (Zr) sites. Since the cathode active material may have a superstructure, oxygen vacancies may be formed in the structure to generate many vacancies in the surface of the cathode active material.

Figure 1:
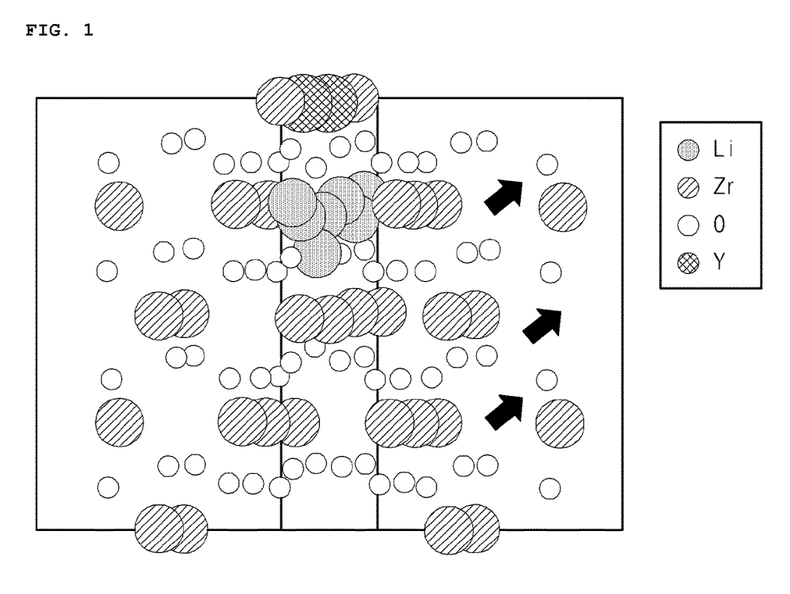
FIG. 1 is a predictive model illustrating the moving path of lithium in yttria stabilized zirconia (YSZ) composite particles that are optimized by discrete Fourier transformation (DFT) structural optimization.
Figure 2:
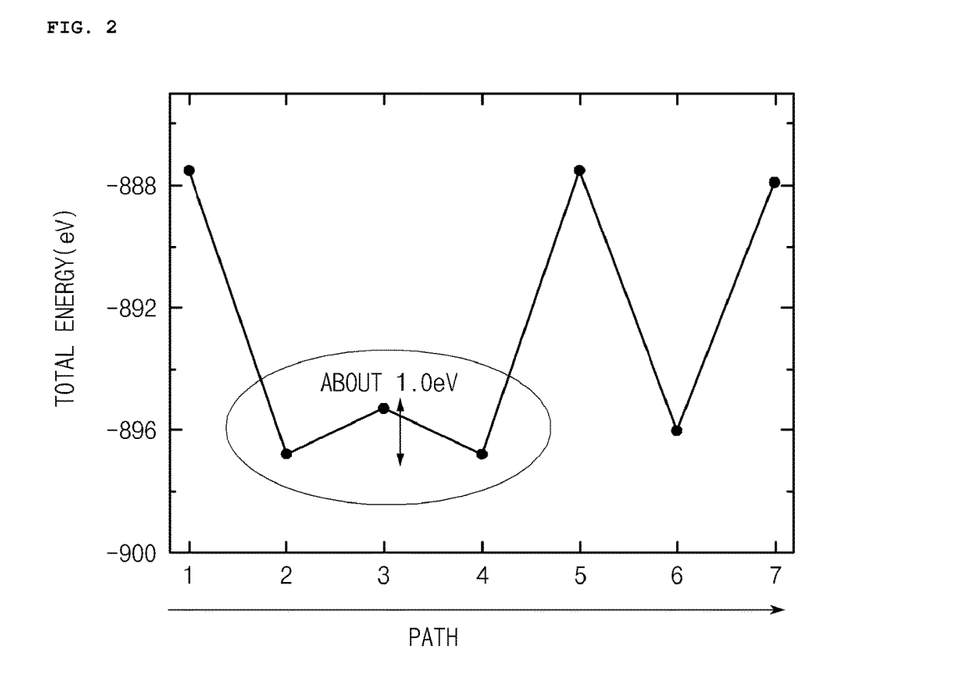
FIG. 2 is a graph analyzing ionic conductivity according to oxygen vacancy in YSZ composite particles that are optimized by DFT structural optimization.

FIGS. 1 and 2 illustrate a predictive model illustrating the moving path of lithium in yttria stabilized zirconia (YSZ) composite particles included in the cathode active material according to the embodiment of the present invention that are optimized by discrete Fourier transformation (DFT) structural optimization, and the comparative analysis of ionic conductivity of lithium ions, respectively.

Referring to FIG. 1, when examining the moving path of lithium in the optimized YSZ, it may be understood that many spaces, through which lithium (Li) may pass, are formed in the surface of the cathode active material due to the vacancies caused by oxygen vacancies in the structure of the YSZ.

Also, as a result of analyzing the ionic conductivity of lithium ions by finding paths, through which the lithium ions may pass in the YSZ, by DFT as in FIG. 2, it may be confirmed that an energy difference of about 1.0 eV was observed in path sections 2, 3, and 4 of FIG. 2 which include oxygen vacancies.

Accordingly, lithium ion conductivity may be very high when the paths including oxygen vacancies are connected, and, in the case that a cathode active material which includes YSZ composite particles having oxygen vacancies is used in a secondary battery, the reduction in capacity and output may be minimized.

Thus, according to an embodiment of the present invention, the YSZ may include oxygen vacancies proportional to the amount of an Y element, and, in the case that the YSZ is coated on the outer surfaces of the lithium transition metal oxide particles according to the embodiment of the present invention, oxygen vacancies may be included in an amount of 0.25 ppm to 4,500 ppm based on a total amount of the cathode active material.

Also, since an impact absorbing effect may be obtained during cathode processing, particularly, pressing due to the structural formation of vacancies, the occurrence of cracks in the cathode active material may be minimized.

For example, the cathode active material according to the embodiment of the present invention has a compressive strength of 80 MPa to 500 MPa, for example, 100 MPa to 200 MPa, under a pressure of 0.5 mN to 10 mN.

For example, the compressive strength may be a value converted to the unit of pressure (MPa) by measuring a force at the time of occurrence of cracks in the particles by applying a force of 0.5 mN to 10 mN to the cathode active material using a micro compression tester (equipment of Korea Electronics Technology Institute).

In the cathode active material according to the first embodiment of the present invention, the composite particles may be coated to a thickness of 1 nm to 5,000 nm from the outer surfaces of the lithium transition metal oxide particles.

Also, a cathode active material according to a second embodiment of the present invention includes lithium transition metal oxide particles and composite particles, wherein the composite particles may be included in the lithium transition metal oxide particles.

In the cathode active material according to the embodiment of the present invention, since the composite particles are included in the lithium transition metal oxide particles to form a composite with the lithium transition metal oxide particles, the composite particles may improve structural stability and electrochemical properties by preventing structural collapse of crystals of the cathode active material.

Specifically, according to an embodiment of the present invention, the composite particles may have a concentration gradient gradually decreasing from the surfaces of the lithium transition metal oxide particles to the inside thereof and may be composited with the lithium transition metal oxide particles to form a composite.

For example, in the cathode active material of the present invention, an amount of the composite particles in an outer bulk of the lithium transition metal oxide particles may be at least 20% or more greater than an amount of the composite particles in an inner bulk of the lithium transition metal oxide particles, and the inner bulk, as the center of the lithium transition metal oxide particles and a peripheral region thereof, may denote a region including 50% of the number of transition metal atoms of the entire particles.

In the case that the YSZ is coated on the inside of the lithium transition metal oxide particles according to the embodiment of the present invention, an amount of oxygen vacancies may be particularly in a range of 0.25 ppm to 4,500 ppm.

The composite particles may be included in a thickness of 1 nm to 5,000 nm in a direction toward the inside of the lithium transition metal oxide particles.

Also, a cathode active material according to a third embodiment of the present invention includes lithium transition metal oxide particles and composite particles, wherein the composite particles may be coated on the outer surfaces of the lithium transition metal oxide particles to form a coating layer and may be included with the lithium transition metal oxide particles in the lithium transition metal oxide particles.

The composite particles may have a concentration gradient gradually decreasing from the surfaces of the lithium transition metal oxide particles to the inside thereof and may be composited with the lithium transition metal oxide particles to form a composite.

Also, in the case that the YSZ is included in both inside and outside of the lithium transition metal oxide particles according to the embodiment of the present invention, an amount of YSZ may be in a range of 50 ppm to 30,000 ppm based on a total amount of the cathode active material.

According to an embodiment of the present invention, the composite particles may be included in an amount of 50 ppm to 30,000 ppm, for example, 100 ppm to 20,000 ppm based on the total amount of the cathode active material.

An average particle diameter of the cathode active material may be in a range of 3 μm to 30 μm.

Also, the cathode active material according to the embodiment of the present invention may further include an oxide including at least one element of Ca, niobium (Nb), tungsten (W), magnesium (Mg), titanium (Ti), boron (B), molybdenum (Mo), and Zr in the coating layer.

The oxide including at least one element of Ca, Nb, W, Mg, Ti, B, Mo, and Zr may be included in an amount of 50 ppm to 30,000 ppm in the coating layer.

Also, in the cathode active material according to the embodiment of the present invention, the lithium transition metal oxide particles may include a compound of Chemical Formula 1 below:

$Li_{(1+a)}Ni_{(1-b-c)}Mn_{(b)}Co_{(c)}M'_{(s)}M''_{(v)}O_2$  <Chemical Formula 1> where M' includes any one selected from the group consisting of Y, Zr, lanthanum (La), strontium (Sr), gallium (Ga), Mg, manganese (Mn), Ca, Sc, and Ni, or mixed elements of two or more thereof, M'' is at least one element of Ca, Nb, W, Mg, Ti, B, Mo, Sc, and Zr, and $0 \leq a < 0.2$, $0 \leq b \leq 1$, $0 \leq c \leq 1$, $0 \leq s \leq 0.2$, and $0 \leq v \leq 0.2$.

According to an embodiment of the present invention, in Chemical Formula 1, $0 \leq a < 0.2$, M' may include any one selected from the group consisting of Zr, Y, Ca, Sc, and Ni, or mixed elements of two or more thereof, and s and v may have a concentration gradient gradually decreasing from the surfaces of the lithium transition metal oxide particles to the inside thereof.

Also, according to an embodiment of the present invention, a in Chemical Formula 1 may satisfy $0 \leq a \leq 0.09$, for example, a=0.

In the case that a in Chemical Formula 1 is greater than 0.09 and particularly, is 0.2 or more, an effect of coating the lithium transition metal oxide particles with the composite particles (e.g., YSZ) may not be significant in which a difference in life characteristics between the above case and a case of coating the lithium transition metal oxide particles with another oxide (e.g., $ZrO_2$) is within about 10%. In contrast, in the case in which a in Chemical Formula 1 is 0.09 or less and particularly, is 0, the effect of coating the lithium transition metal oxide particles with the composite particles may be significant in which the difference in life characteristics between the above case and a case of coating the lithium transition metal oxide particles with another oxide is in a range of 30% to 70%.

The present invention provides a method of preparing the above cathode active material.

A method of preparing a cathode active material according to an embodiment of the present invention may include mixing lithium transition metal oxide particles and composite particles and heat treating the mixture, wherein the composite particles may include any one selected from the group consisting of yttria stabilized zirconia (YSZ), gadolinia-doped ceria (GDC), LaSrGaMg (LSGM), $La_{(1-x)}Sr_x$-$MnO_3$ (LSM), CSZ, SSZ, and Ni—YSZ, or a mixture of two or more thereof.

According to an embodiment of the present invention, the composite particles may include any one selected from the group consisting of YSZ, CSZ, and SSZ, or a mixture of two or more thereof.

According to an embodiment of the present invention, the heat treatment may be performed in a temperature range of 100° C. to 1,200° C. for 4 hours to 24 hours.

According to the method of preparing a cathode active material according to the embodiment of the present invention, the formation of a coating layer on the surfaces of the lithium transition metal oxide particles or the formation of a composite with the lithium transition metal oxide particles by including the composite particles in the lithium transition metal oxide particles may be affected by heat treatment temperature and time during the heat treatment after the mixing of the cathode active material and the composite particles.

For example, in the case that the heat treatment is performed in a temperature range of 100° C. to 600° C. according to the embodiment of the present invention, a coating layer may be formed on outer surfaces of the lithium transition metal oxide particles by the heat treatment.

That is, in the case that the heat treatment is performed in a temperature range of 100° C. to 600° C., a coating layer is formed on the surfaces of lithium transition metal oxide particles, the coating layer includes any one selected from the group consisting of YSZ, GDC, LSGM, LSM, CSZ, SSZ, and Ni—YSZ, or a mixture of two or more thereof, and a cathode active material that includes composite particles having a single-phase peak during the XRD measurement may be obtained.

According to an embodiment of the present invention, a portion of the composite particles may be included in the lithium transition metal oxide even by the heat treatment in a temperature range of 100° C. to 600° C. In this case, the composite particles may have a concentration gradient gradually decreasing from the surfaces of the lithium transition metal oxide particles to the inside thereof, and may be composited with the lithium transition metal oxide particles by being included in the surfaces and inside of the lithium transition metal oxide particles to form a composite. In this case, the composite particles, for example, may be included in a thickness of about 500 nm from the surfaces of the lithium transition metal oxide particles to the inside thereof.

Also, according to an embodiment of the present invention, in the case that the heat treatment, for example, is performed in a temperature range of 600° C. to 1,200° C., a cathode active material including composite particles in lithium transition metal oxide particles may be obtained by the heat treatment, and in this case, as described above, the composite particles may include any one selected from the group consisting of YSZ, GDC, LSGM, LSM, CSZ, SSZ, and Ni—YSZ, or a mixture of two or more thereof.

In this case, the composite particles may have a concentration gradient gradually decreasing from the surfaces of the lithium transition metal oxide particles to the inside thereof and may be composited with the lithium transition metal oxide particles to form a composite. In this case, the composite particles, for example, may be included in a thickness of about 500 nm or more from the surfaces of the lithium transition metal oxide particles to the inside thereof.

According to an embodiment of the present invention, the composite particles may be present on the outer surfaces of the lithium transition metal oxide particles even in the case in which the heat treatment is performed in a temperature range of 600° C. to 1,200° C.

According to the method of preparing a cathode active material according to the embodiment of the present invention, the transition metal oxide particles may include transition metal composite oxide particles of Chemical Formula 1 below, and s and v may have a concentration gradient gradually decreasing from the surfaces of the lithium transition metal oxide particles to the inside thereof:

$$Li_{(1+a)}Ni_{(1-b-c)}Mn_{(b)}Co_{(c)}M'_{(s)}M''_{(v)}O_2 \qquad \text{<Chemical Formula 1>}$$

where M', M", a, b, c, s, and v are the same as described above.

According to the method of preparing a cathode active material according to the embodiment of the present invention, an average particle diameter ($D_{50}$) of the composite particles used as a surface modifier is in a range of 5 nm to 500 nm, may be in a range of 20 nm to 200 nm, and for example, may be in a range of 30 nm to 100 nm.

In the present invention, the average particle diameter ($D_{50}$) of the composite particles may be defined as a particle diameter at 50% in a cumulative particle diameter distribution. For example, the average particle diameter ($D_{50}$) of the particles according to the embodiment of the present invention may be measured by using a laser diffraction method. The laser diffraction method may generally measure a particle diameter ranging from a submicron level to a few mm, and may obtain highly repeatable and high resolution results.

For example, a method of measuring an average particle diameter ($D_{50}$) of the YSZ may be performed in such a manner that the YSZ is dispersed in a solution, the solution is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

According to an embodiment of the present invention, the surface modifier (composite particles) may be used in an amount of 50 ppm to 30,000 ppm.

According to the method of preparing a cathode active material according to the embodiment of the present invention, a dry mixing method or wet mixing method may be used for the mixing.

In the preparation method according to the embodiment of the present invention, the dry mixing may be performed by a mixing method using a shaker, a mortar grinder mixing method, and a mechanical milling method. For example, it may be desirable to use the mechanical milling method to form a uniform coating layer.

Specifically, the mixing method using a shaker may be performed in such a manner that lithium transition metal oxide particles and composite particles are mixed by hand mixing and shaking several times.

Also, the mortar grinder mixing method is a method of uniformly mixing lithium transition metal oxide particles and composite particles using a mortar.

Also, the mechanical milling method, for example, may mix lithium transition metal oxide particles and composite particles by mechanical attrition using a roll mill, ball mill, high energy ball mill, planetary mill, stirred ball mill, vibrating mill, or jet mill, and for example, compressive stress may be mechanically applied by rotating at a speed of 100 rpm to 1,000 rpm.

Also, the present invention provides a cathode including the cathode active material.

The cathode may be prepared according to a typical method known in the art. For example, a binder, a conductive agent, and a dispersant, if necessary, as well as a solvent are mixed with a cathode active material and stirred to prepare a slurry, and a metal current collector is then coated with the slurry and pressed. Thereafter, the cathode may be prepared by drying the metal current collector.

Any metal may be used as the metal current collector so long as it is a metal having high conductivity as well as no reactivity in a voltage range of the battery to which the slurry of the cathode active material may be easily adhered. Non-limiting examples of the cathode collector may include aluminum, nickel, or a foil prepared by a combination thereof.

An organic solvent, such as N-methylpyrrolidone (NMP), dimethylformamide (DMF), acetone, and dimethylacetamide, or water may be used as the solvent for forming the cathode. These solvents may be used alone or in a mixture of two or more thereof. An amount of the solvent used may be sufficient if the solvent may dissolve and disperse the cathode active material, the binder, and the conductive agent in consideration of a coating thickness of the slurry and manufacturing yield.

Various types of binder polymers, such as a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, a styrene-butadiene rubber (SBR), a fluorine rubber, poly (acrylic acid), polymers in which hydrogens thereof are substituted with Li, sodium (Na), or Ca, or various copolymers, may be used as the binder.

Any conductive agent may be used without particular limitation so long as it has suitable conductivity without causing adverse chemical changes in the batteries. For example, the conductive agent may include a conductive material such as: graphite such as natural graphite and artificial graphite; carbon black such as carbon black, acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives.

An aqueous-based dispersant or an organic dispersant, such as N-methyl-2-pyrrolidone, may be used as the dispersant.

Also, the present invention provides a lithium secondary battery including the cathode, an anode, and a separator disposed between the cathode and the anode.

A carbon material, lithium metal, silicon, or tin, which may intercalate and deintercalate lithium ions, may be typically used as an anode active material that is used in the anode according to an embodiment of the present invention. For example, the carbon material may be used and both low crystalline carbon and high crystalline carbon may be used as the carbon material. Typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature baked carbon such as petroleum or coal tar pitch derived cokes.

Furthermore, the anode collector is generally fabricated to have a thickness of 3 μm to 500 μm. The anode collector is not particularly limited so long as it has conductivity without causing adverse chemical changes in the batteries. The anode collector may be formed of, for example, copper, stainless steel, aluminum, nickel, titanium, baked carbon, copper or stainless steel that is surface-treated with one of carbon, nickel, titanium, silver, or the like, an aluminum-cadmium alloy, or the like. Also, like the cathode collector, the anode collector may have a fine roughness surface to improve bonding strength of an anode active material. The anode collector may have various shapes such as a film, a sheet, a foil, a net, a porous body, a foam body, a non-woven fabric body, and the like.

Similar to the cathode, a binder and a conductive agent, which are typically used in the art, may be used in the anode. An anode active material and the above additives are mixed and stirred to prepare an anode active material composition. Then, a current collector is coated therewith and pressed to prepare the anode.

Also, a typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator. Also, a typical porous nonwoven fabric, for example, a nonwoven fabric formed of high melting point glass fibers or polyethylene terephthalate fibers may be used. However, the present invention is not limited thereto.

A lithium salt, which may be included as the electrolyte used in the present invention, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N$ $CF_3CF_2(CF_3)_2CO^-$, $(CF_3SO_2)_2CH^-$, $(SF_5)_3C^-$, $(CF_3SO_2)_3C_-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

The electrolyte used in the present invention may include an organic liquid electrolyte, an inorganic liquid electrolyte, a solid polymer electrolyte, a gel-type polymer electrolyte, a solid inorganic electrolyte, and a molten inorganic electrolyte, which may be used in the preparation of a lithium secondary battery. However, the present invention is not limited thereto.

A shape of the lithium secondary battery of the present invention is not particularly limited, and for example, a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Preferred examples of the medium and large sized device may be an electric vehicle, a hybrid electric vehicle, a plug-in hybrid electric vehicle, or a power storage system, but the medium and large sized device is not limited thereto.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Hereinafter, the present invention will be described in more detail, according to examples and experimental examples. However, the present invention is not limited thereto.

<Preparation of Lithium Transition Metal Oxide>

Preparation Example 1

55.84 g of $LiOH(H_2O)$ and 123.61 g of $Ni_{0.6}Mn_{0.2}Co_{0.2}(OH_2)$ having an average particle diameter of 12 μm were put in a laboratory mixer and mixed at a speed of the center of the mixer of 18,000 rpm for 1 minute.

The precursor thus obtained was put in a 500 cc aluminum crucible and sintered at about 900° C. for 6 hours in an air atmosphere. A cake obtained after the sintering was ground and then classified using a 400 mesh sieve (Tyler Standard Screen Scale, U.S.A) to obtain $LiNi_{0.6}Mn_{0.2}Co_{0.2}O_2$.

<Preparation of Cathode Active Material>

Example 1

118.4 g of $LiNi_{0.6}Mn_{0.2}Co_{0.2}O_2$ and 1.6 g of 50 nm YSZ $(Zr_{0.84}Y_{0.16}O_{1.92})$ were put in a dry mixer (Lödige mixer, FM-130D type, MATSUBO Corporation) and mixed for 1 minute. Thereafter, a heat treatment was performed at 900° C. for 6 hours in a sintering furnace, and grinding in a mortar and sieving were then performed to obtain a cathode active material including YSZ in $LiNi_{0.6}Mn_{0.2}Co_{0.2}O_2$.

Example 2

A cathode active material was obtained in the same manner as in Example 1 except that 3.16 g of YSZ $(Zr_{0.84}Y_{0.16}O_{1.92})$ was added instead of 1.6 g of YSZ $(Zr_{0.84}Y_{0.16}O_{1.92})$ in Example 1.

Example 3

A cathode active material, in which YSZ was coated on the outer surface of $LiNi_{0.6}Mn_{0.2}Co_{0.2}O_2$, was obtained in the same manner as in Example 1 except that the heat treatment was performed at 500° C. for 6 hours.

Example 4

A cathode active material, in which YSZ was included in the outer surface and inside of $LiNi_{0.8}Mn_{0.1}Co_{0.1}O_2$, was obtained in the same manner as in Example 1 except that $LiNi_{0.8}Mn_{0.1}Co_{0.1}O_2$ was used instead of $LiNi_{0.6}Mn_{0.2}Co_{0.2}O_2$ in Example 1 and the heat treatment was performed at 550° C.

Comparative Example 1

Preparation Example 1 was used as a cathode active material.

Comparative Example 2

A cathode active material was obtained in the same manner as in Example 1 except that $Li_{1.2}Ni_{0.8}Mn_{0.1}Co_{0.1}O_2$ (Li/M=1.2) was used instead of $LiNi_{0.6}Mn_{0.2}Co_{0.2}O_2$ (Li/M=1).

Comparative Example 3

A cathode active material was obtained in the same manner as in Example 4 except that $Li_{2.2}Ni_{0.8}Mn_{0.1}Co_{0.2}O_2$ (Li/M=1.2) was used instead of $LiNi_{0.6}Mn_{0.2}Co_{0.2}O_2$ (Li/M=1) and 1.6 g of $ZrO_2$ was used instead of YSZ.

Comparative Example 4

A cathode active material was obtained in the same manner as in Example 4 except that $LiNi_{0.8}Mn_{0.1}Co_{0.1}O_2$ (Li/M=1) was used instead of $LiNi_{0.6}Mn_{0.2}Co_{0.2}O_2$ (Li/M=1), 3.16 g of $ZrO_2$ was used instead of YSZ, and a heat treatment was performed at 550° C.

Comparative Example 5

A cathode active material was obtained in the same manner as in Example 4 except that $Li_{2.2}Ni_{0.8}Mn_{0.1}Co_{0.2}O_2$ (Li/M=1.2) was used instead of $LiNi_{0.6}Mn_{0.2}Co_{0.2}O_2$ (Li/M=1).

<Preparation of Lithium Secondary Battery>

Example 5

Cathode Preparation

A cathode mixture slurry was prepared by adding 94 wt % of the cathode active material prepared in Example 1, 3 wt % of carbon black as a conductive agent, and 3 wt % of PVdF as a binder to N-methyl-2-pyrrolidone (NMP) as a solvent. An about 20 μm thick aluminum (Al) thin film as a cathode collector was coated with the cathode mixture slurry and dried, and the Al thin film was then roll-pressed to prepare a cathode.

Anode Preparation

An anode active material slurry was prepared by mixing 96.3 wt % of carbon powder as an anode active material, 1.0 wt % of super-p as a conductive agent, and 1.5 wt % of styrene-butadiene rubber (SBR) and 1.2 wt % of carboxymethyl cellulose (CMC) as a binder, and adding the mixture to NMP as a solvent. A 10 μm thick copper (Cu) thin film as an anode collector was coated with the anode active material slurry and dried, and the Cu thin film was then roll-pressed to prepare an anode.

Non-Aqueous Electrolyte Solution Preparation

A 1 M $LiPF_6$ non-aqueous electrolyte solution was prepared by adding $LiPF_6$ to a non-aqueous electrolyte solvent that was prepared by mixing ethylene carbonate and diethyl carbonate, as an electrolyte, at a volume ratio of 30:70.

Lithium Secondary Battery Preparation

A mixed separator of polyethylene and polypropylene was disposed between the cathode and anode thus prepared, and a polymer type battery was then prepared by a typical method. Then, the preparation of each lithium secondary battery was completed by injecting the prepared non-aqueous electrolyte solution.

Examples 6 to 8

Lithium secondary batteries were prepared in the same manner as in Example 5 except that the cathode active materials prepared in Examples 2 to 4 were respectively used.

Comparative Examples 6 to 10

Lithium secondary batteries were prepared in the same manner as in Example 5 except that the cathode active materials prepared in Comparative Examples 1 to 5 were respectively used.

Compositions of the examples and comparative examples are summarized as follows:

TABLE 1

| Cathode active material/secondary battery | Composition | Composite particles/oxide |
|---|---|---|
| Example 1 (Example 5) | Inside compositing (622 Li/M = 1) | YSZ (1.6 g) |
| Example 2 (Example 6) | Inside compositing (622 Li/M = 1) | YSZ (3.16 g) |
| Example 3 (Example 7) | Outside coating (622 Li/M = 1) | YSZ (1.6 g) |
| Example 4 (Example 8) | Outside coating and inside compositing (811 Li/M = 1) | YSZ (1.6 g) |
| Comparative Example 1 (Comparative Example 6) | BARE | |
| Comparative Example 2 (Comparative Example 7) | Inside compositing (811 Li/M = 1.2) | YSZ (1.6 g) |
| Comparative Example 3 (Comparative Example 8) | Outside coating and inside compositing (811 Li/M = 1.2) | YSZ (1.6 g) |
| Comparative Example 4 (Comparative Example 9) | Outside coating and inside compositing (811 Li/M = 1) | $ZrO_2$ |
| Comparative Example 5 (Comparative Example 10) | Outside coating and inside compositing (811 Li/M = 1.2) | $ZrO_2$ |

Experimental Example 1: Electrochemical Experiment 1

<Cycle Characteristic Evaluation Experiments>

The following electrochemical evaluation experiments were conducted to investigate relative efficiencies of the lithium secondary batteries obtained in Examples 5 to 7 and Comparative Examples 6 and 7 according to the number of cycles.

Specifically, the lithium secondary batteries obtained in Examples 5 to 7 and Comparative Examples 6 and 7 were charged at a constant current (CC) of 1 C to a voltage of 4.35 V at 45° C., and thereafter, charge in the first cycle was performed by charging the lithium secondary batteries at a constant voltage (CV) of 4.35 V to a current of 0.05 mAh. After the batteries were left standing for 20 minutes, the batteries were discharged at a constant current of 2 C to a voltage of 3.0 V (cut-off current was 0.05 C). This charge and discharge cycle was repeated 1 to 29 times and 1 to 49 times. The results thereof are presented in FIG. 3 and FIG. 4, respectively.

Figure 3:
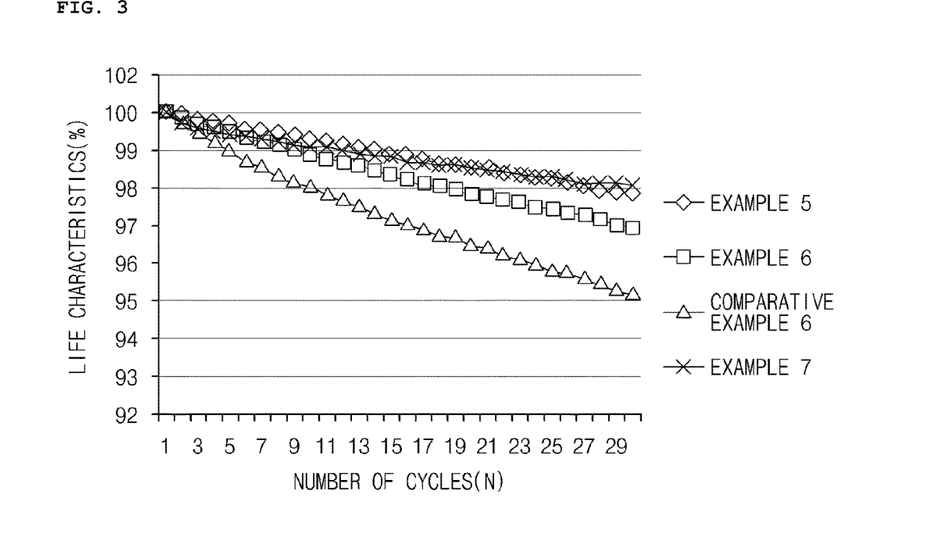
FIG. 3 is a graph illustrating life characteristics of lithium secondary batteries prepared in Examples 5 to 7 of the present invention and Comparative Example 6.

Specifically, FIG. 3 is a graph illustrating life characteristics of the lithium secondary batteries of Examples 5 to 7 and Comparative Example 6.

As illustrated in FIG. 3, with respect to the lithium secondary batteries of Examples 5 to 7, it may be confirmed that slopes with respect to the relative efficiencies from the $1^{st}$ cycle to a $29^{th}$ cycle were moderate in comparison to Comparative Example 6. Also, as in Examples 5 and 6, it may be understood that life characteristics were also affected by the amount of YSZ used in the preparation of the cathode active material.

That is, in the case that the amount of YSZ used was increased to about 2 times, it may be confirmed that life characteristics (%) were decreased as the number of cycles increased. Specifically, it may be confirmed that Example 5 and Example 6 exhibited similar life characteristics up to a $10^{th}$ cycle, but after the $10^{th}$ cycle, the life characteristics of Example 6 were slightly more decreased than that of Example 5.

In contrast, with respect to Examples 5 and 6, it may be understood that the life characteristics were improved by about 3% or more in comparison to Comparative Example 6.

With respect to the lithium secondary battery of Example 7 using the cathode active material in which YSZ was coated on the outer surface of $LiNi_{0.6}Mn_{0.2}Co_{0.2}O_2$ at a lower heat treatment temperature, it may be understood that life characteristics were the best.

In contrast, with respect to Comparative Example 6 in which YSZ was not included in the inside or outside, it may be confirmed that the slope was rapidly decreased from a $3^{rd}$ cycle and was decreased by 4% or more at the $29^{th}$ cycle.

Thus, it may be understood that since the lithium transition metal oxide particles and the composite particles were included according to the embodiment of the present invention, stable cycle characteristics may be maintained for a long period of time by mitigating secondary battery cycle degradation.

Figure 4:
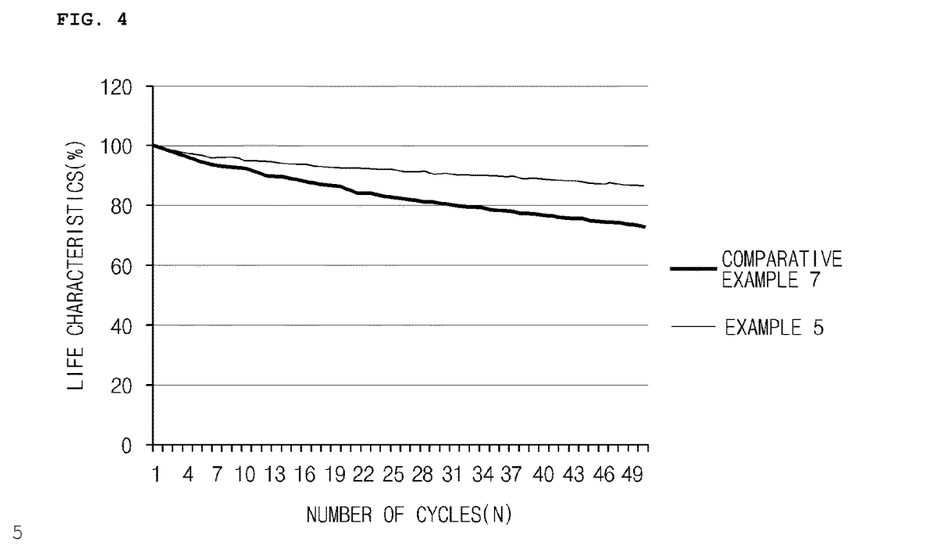
FIG. 4 is a graph illustrating life characteristics of lithium secondary batteries prepared in Example 5 of the present invention and Comparative Example 7.

In order to compare life characteristics according to the amount of lithium in the lithium transition metal oxide particles, FIG. 4 illustrates a graph illustrating the results of life characteristics of Example 5 including YSZ and Comparative Example 7. Charge and discharge cycle was performed by the same method as in FIG. 3, but the charge and discharge cycle was repeated 1 to 49 times.

Referring to FIG. 4, it may be understood that the lithium secondary battery of Example 5, which uses the cathode active material including YSZ and having a ratio of Li/transition metal (M) of 1, had significantly better life characteristics than the lithium secondary battery of Comparative Example 7 which uses the cathode active material including YSZ and having excessive lithium, i.e., a ratio of Li/transition metal (M) of 1.2.

That is, the slopes of Example 5 and Comparative Example 7 were similar to each other to about the $10^{th}$ cycle. However, it may be understood that the life characteristics of the lithium secondary battery of Comparative Example 7 were significantly decreased after the $10^{th}$ cycle, and at about the $49^{th}$ cycle, the life characteristics of the lithium secondary battery of Example 5 were increased by about 10% or more in comparison to those of the lithium secondary battery of Comparative Example 7.

Experimental Example 2: Compression Fracture Strength Test

Figure 5:
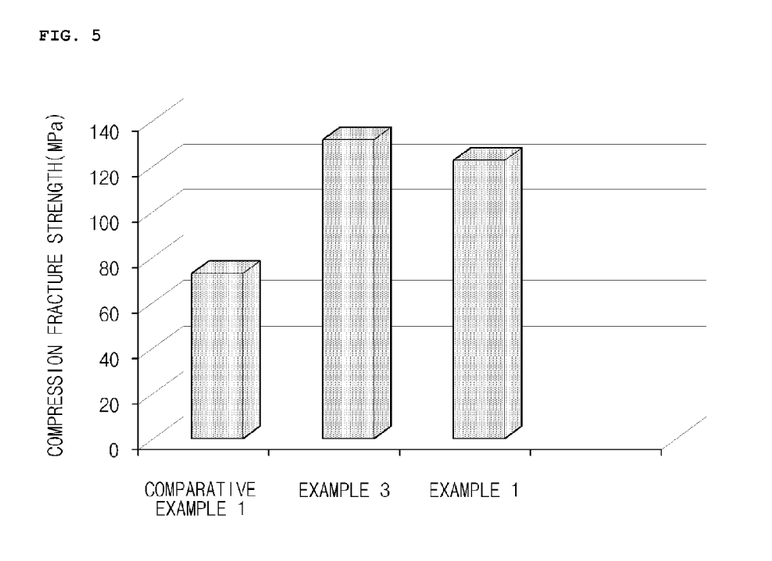
FIG. 5 is a graph illustrating compression fracture strengths in which strengths of anode active material particles of Examples 1 to 3 of the present invention and Comparative Example 1.

Strengths of the cathode active material particles of Examples 1 to 3 and Comparative Example 1 were measured and evaluated with a micro compression tester (equipment of Korea Electronics Technology Institute), and the results thereof are presented in FIG. 5.

Cathode active material samples of Examples 1 to 3 and Comparative Example 1 were used for the compressive strength measurements. A force at the time of occurrence of cracks in the particles was measured by applying a force of 0.5 mN to 10 mN to each cathode active material sample and was converted to the unit of pressure (MPa).

Referring to FIG. 5, with respect to Examples 1 and 3 including YSZ in the inside and outside of the lithium transition metal oxide particles, it may be understood that compression fracture strengths (MPa) were increased by about 1.5 times to about 2 times in comparison to that of comparative Example 1 using the cathode active material which did not include YSZ.

Specifically, with respect to Example 3 including YSZ in the outside of the lithium transition metal oxide particles, the compression fracture strength (MPa) was 120 MPa and, with respect to Example 1 including YSZ in the inside of the lithium transition metal oxide particles, the compression fracture strength (MPa) was 118 MPa.

In contrast, with respect to the lithium transition metal oxide particles not including YSZ as in Comparative Example 1, the compression fracture strength (MPa) was only 60 MPa corresponding to about 50% of the compression fracture strengths of Examples 1 and 3.

Thus, it may be estimated that since the cathode active material of the present invention includes YSZ, a better impact absorbing effect may be obtained due to the presence of oxygen vacancies.

Referring to FIG. 5, it may be understood that since the cathode active material of the present invention includes YSZ, the impact absorbing effect may be obtained during pressing to minimize the occurrence of cracks in the cathode active material.

Experimental Example 3: Electrochemical Experiment 2

<Cycle Characteristic Evaluation Experiments According to the Amount of Lithium and Components of Coating Layers>

The following electrochemical evaluation experiments were conducted to investigate relative efficiencies of the lithium secondary batteries obtained in Example 8 and Comparative Examples 8 to 10 according to the amount of lithium and components of coating layers.

Specifically, the lithium secondary batteries obtained in Example 8 and Comparative Examples 8 to 10 were charged at a constant current (CC) of 1 C to a voltage of 4.2 V at 45° C., and thereafter, charge in the first cycle was performed by charging the lithium secondary batteries at a constant voltage (CV) of 4.2 V to a current of 0.05 mAh. After the batteries were left standing for 20 minutes, the batteries were discharged at a constant current of 1 C to a voltage of 3.0 V (cut-off current was 0.05 C). This charge and discharge cycle was repeated 1 to 200 times. The results thereof are presented in FIGS. 6 and 7.

Figure 6:
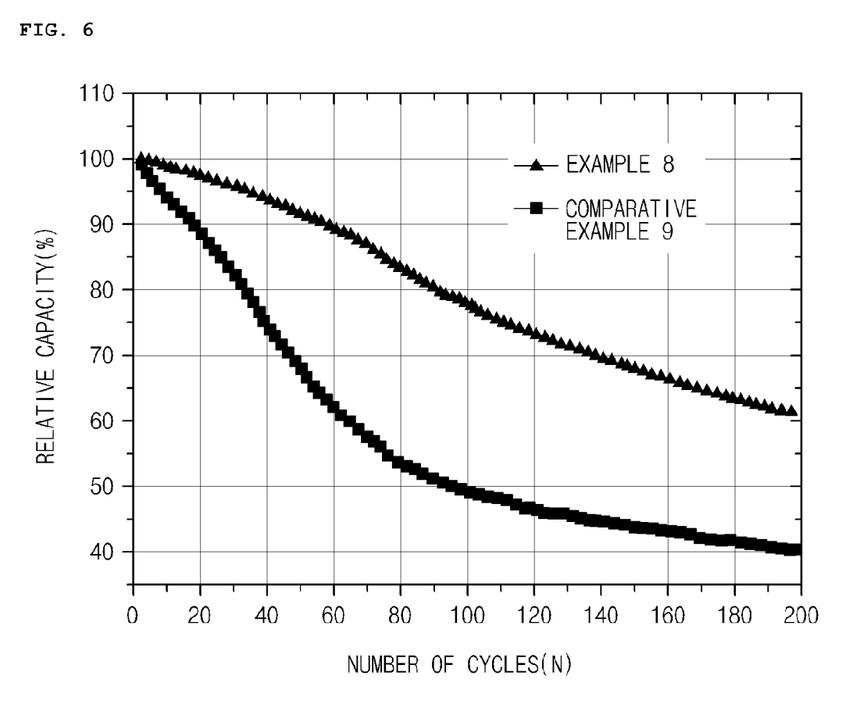
FIG. 6 is a graph illustrating life characteristics of lithium secondary batteries prepared in Example 8 of the present invention and Comparative Example 9.
Figure 7:
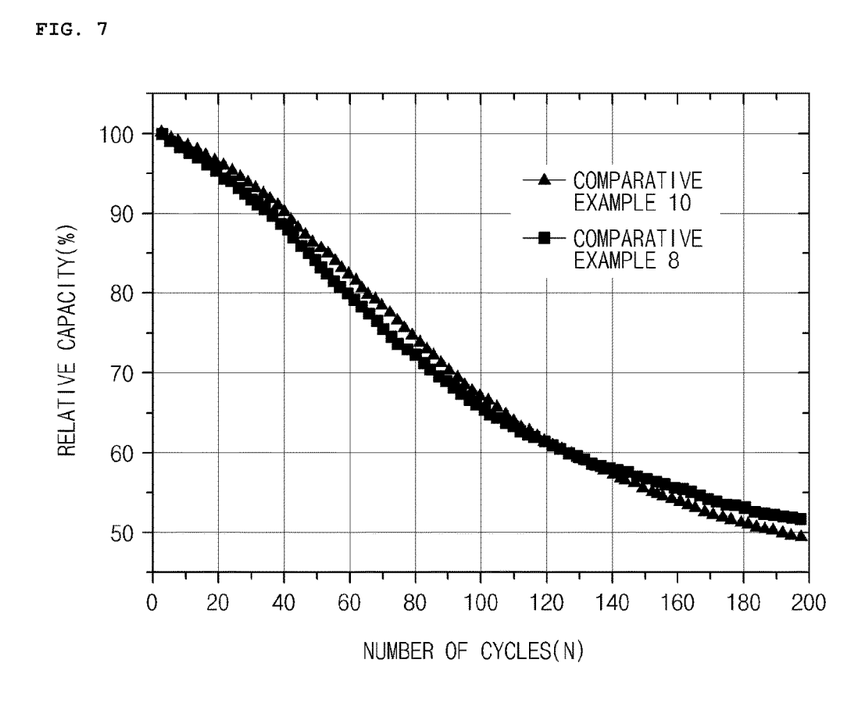
FIG. 7 is a graph illustrating life characteristics of lithium secondary batteries prepared in Comparative Examples 8 and 10.

Specifically, FIG. 6 compares life characteristics of the secondary batteries using $LiNi_{0.8}Mn_{0.1}Co_{0.1}O_2$ (Li/M=1), and FIG. 7 compares life characteristics (relative capacity %) of the secondary batteries using $Li_{1.2}Ni_{0.8}Mn_{0.1}Co_{0.1}O_2$ (Li/M=1.2).

As illustrated in FIG. 6, with respect to $LiNi_{0.8}Mn_{0.1}Co_{0.1}O_2$ (Li/M=1), when comparing the life characteristics of the secondary battery (Example 8), which uses the cathode active material including YSZ in the inside and outside of the cathode active material, with the life characteristics of the secondary battery (Comparative Example 9) which uses the cathode active material including $ZrO_2$, a significant difference between relative capacity (%) values of 50% or more was obtained from the $1^{st}$ cycle to a $200^{th}$ cycle.

In contrast, with respect to $Li_{1.2}Ni_{0.8}Mn_{0.1}Co_{0.1}O_2$ (Li/M=1.2) as illustrated in FIG. 7, when comparing the life characteristics of the secondary battery (Example 10), which uses the cathode active material including YSZ in the inside and outside of the cathode active material, with the life characteristics of the secondary battery (Comparative Example 8) which uses the cathode active material including $ZrO_2$, similar relative capacity (%) values were obtained from the $1^{st}$ cycle to the $200^{th}$ cycle.

From the above results, in the case that the composite particles, such as YSZ, were used according to the present invention, since a significant difference between a case of Li/M=1 and a case of Li/M=1.2, i.e., lithium excessive, in the lithium transition metal oxide particles was obtained in comparison to the secondary battery including $ZrO_2$, it may be understood that the life characteristics were more affected.

Experimental Example 4: X-Ray Diffraction (XRD) Analysis

Figure 8:
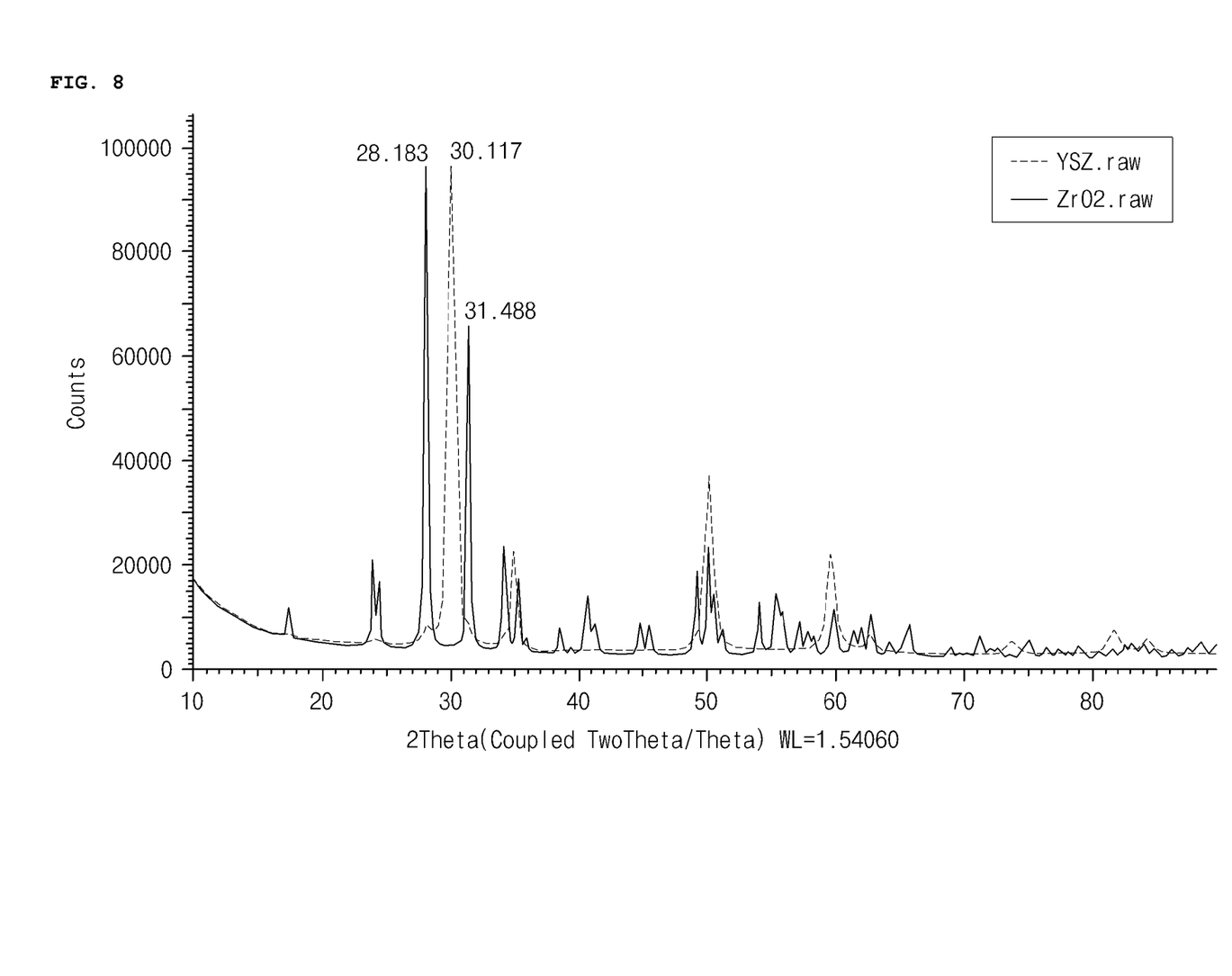
FIG. 8 is a graph illustrating the results of X-ray diffraction (XRD) analysis of YSZ composite particles included in a cathode active material of the present invention and $ZrO_2$.

In order to perform comparative analysis on XRD phases of YSZ and $ZrO_2$ which were included in the cathode active materials of the present invention, XRD diffraction measurements using Cu Kα line were conducted on YSZ and $ZrO_2$, and the results thereof are presented in FIG. 8.

target: Cu(Kα-line) graphite monochromator
slit: divergence slit=0.5 degree, receiving slit=9.55 mm, scattering slit=5.89 degree
measurement range and step angle/measurement time: 10.0°<2θ<90°, 0.024°/0.5 seconds, where "2θ" represents a diffraction angle.

Referring to FIG. 8, it may be confirmed that YSZ had a cubic crystal structure, but $ZrO_2$ had a monoclinic crystal structure. Also, it may be understood that the YSZ had single-phase peaks in which a main peak was present at a 2θ of 29 degrees to 31 degrees, and it may be confirmed that the YSZ peaks were clearly distinguished from peaks of $ZrO_2$ which did not exist as a single phase. In particular, a main peak of $ZrO_2$ was present between 27.5 degrees and 28.5 degrees and a secondary peak was present between 31.1 degrees and 31.8 degrees. Since the positions of the main peaks were significantly different, the YSZ and $ZrO_2$ were fundamentally different phases and may be also considered as completely different materials in terms of crystal characteristics.

Figure 9:
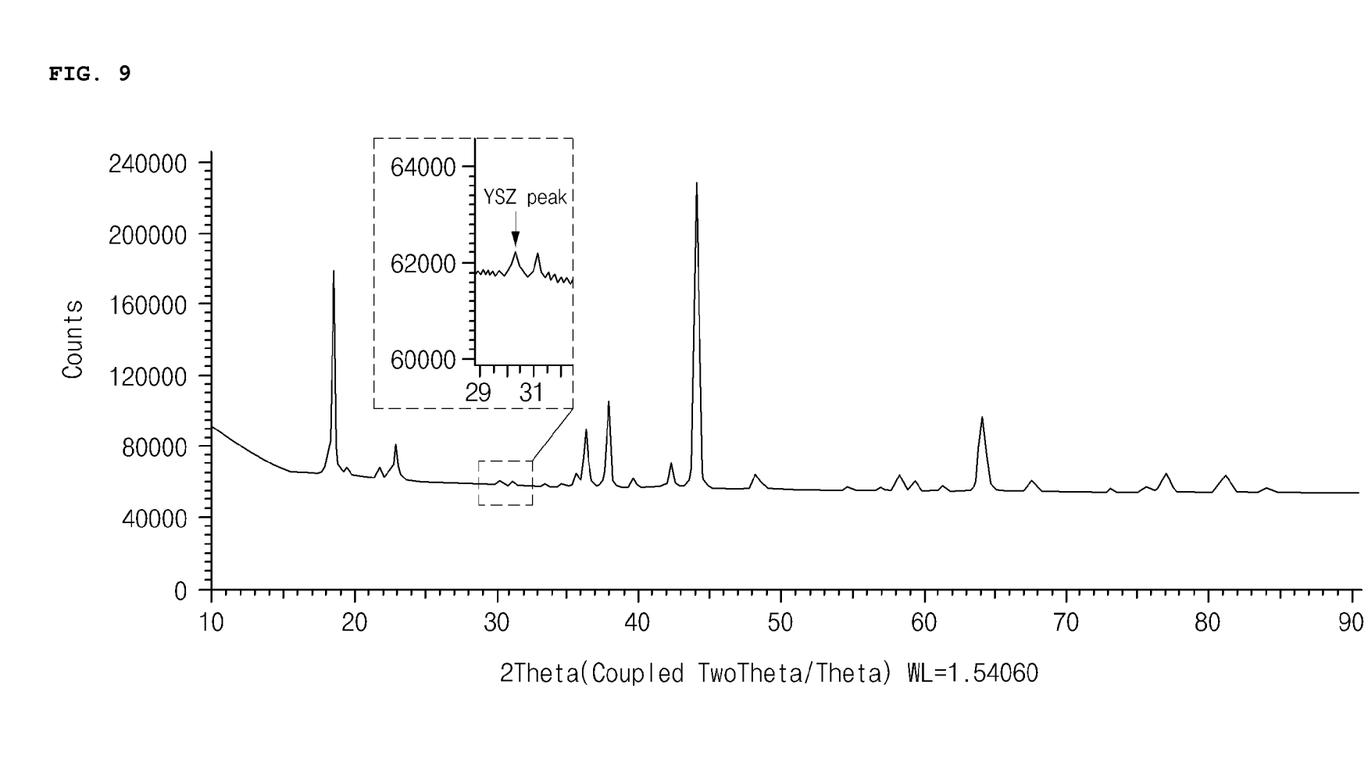
FIG. 9 is a graph illustrating the results of XRD analysis of a cathode active material of Example 4 of the present invention.

FIG. 9 is a graph illustrating the results of analyzing $LiNi_{0.8}Mn_{0.1}Co_{0.1}O_2$ (Li/M=1) including YSZ of Example 4 under the same XRD measurement conditions as the above.

As illustrated in FIG. 9, with respect to $LiNi_{0.8}Mn_{0.1}Co_{0.1}O_2$ (Li/M=1) of Example 4, it may be confirmed that the YSZ peak observed in FIG. 8 was present at a 2θ of 27.5 degrees to 28.5 degrees.

That is, this indicated that a composite phase of YSZ was present on the outer surface of the cathode active material and was present in the form of a composite in the inside of the surface thereof. With respect to the YSZ included in the cathode active material, a secondary phase was not observed, but a single phase of the layered transition metal oxide was observed. That is, it may be considered that the single-phase YSZ was present in the form of a composite in the inside and outside of the cathode active material.

The invention claimed is:

1. A cathode active material comprising:
   lithium transition metal oxide particles; and
   composite particles,
   wherein the composite particles comprise any one selected from the group consisting of yttria stabilized zirconia (YSZ), gadolinia-doped ceria (GDC), lanthanum strontium gallate magnesite (LSGM), calcium (Ca)-doped zirconia or calcia stabilized zirconia (CSZ), scandium (Sc)-doped zirconia (SSZ), and nickel (Ni)—YSZ, or a mixture of two or more thereof, and
   the composite particles have a single-phase peak when analyzed by X-ray diffraction (XRD).

2. The cathode active material of claim 1, wherein the composite particles are coated on outer surfaces of the lithium transition metal oxide particles to form a coating layer.

3. The cathode active material of claim 1, wherein the composite particles are included in the lithium transition metal oxide particles.

4. The cathode active material of claim 3, wherein the composite particles have a concentration gradient gradually decreasing from surfaces of the lithium transition metal oxide particles to inside thereof and are composited with the lithium transition metal oxide particles to form a composite.

5. The cathode active material of claim 4, wherein a concentration of the composite particles in an outer bulk of the lithium transition metal oxide particles is at least 20% or more greater than a concentration of the composite particles in an inner bulk of the lithium transition metal oxide particles, and wherein the inner bulk, as definited from a center of the lithium transition metal oxide particles to a peripheral region thereof, is a region including 50% of the number of transition metal atoms of the entire particles.

6. The cathode active material of claim 4, wherein the composite particles are included in a thickness of 1 nm to 5,000 nm in a direction from the surfaces toward the inside of the lithium transition metal oxide particles.

7. The cathode active material of claim 2, wherein the composite particles are coated to a thickness of 1 nm to 5,000 nm from the outer surfaces of the lithium transition metal oxide particles.

8. The cathode active material of claim 1, wherein the composite particles are coated on outer surfaces of the lithium transition metal oxide particles to form a coating layer and are included with the lithium transition metal oxide particles in the lithium transition metal oxide particles.

9. The cathode active material of claim 8, wherein the composite particles are included in an amount of 50 ppm to 30,000 ppm based on a total amount of the cathode active material.

10. The cathode active material of claim 8, wherein the composite particles have a concentration gradient gradually decreasing from the surfaces of the lithium transition metal oxide particles to inside thereof and are composited with the lithium transition metal oxide particles to form a composite.

11. The cathode active material of claim 1, wherein the composite particles comprise any one selected from the group consisting of YSZ, CSZ, and SSZ, or two or more thereof.

12. The cathode active material of claim 11, wherein the YSZ comprises oxygen vacancies proportional to an amount of an yttrium (Y) element.

13. The cathode active material of claim 12, wherein the YSZ is $Zr_{(1-x)}Y_xO_{2-x/2}$ (0.01≤x≤0.30).

14. The cathode active material of claim 12, wherein the oxygen vacancies are included in an amount of 0.25 ppm to 4,500 ppm based on a total amount of the cathode active material.

15. The cathode active material of claim 11, wherein the SSZ is $(ZrO_2)_{1-2x}(Sc_2O_3)_x$, $(ZrO_2)_{1-2x}(Sc_2O_3)_{x-z}(Y_2O_3)_z$, or $(ZrO_2)_{1-2x-z}(Sc_2O_3)_x(CeO_2)_z$ (0<x≤0.25) (0<z≤0.1), and the CSZ comprises CaO in an amount of 2 wt % to 17 wt % based on a total weight of the CSZ.

16. The cathode active material of claim 13, wherein x is between 0.03 and 0.20.

17. The cathode active material of claim 2, wherein the coating layer further comprises an oxide including at least one element of calcium (Ca), niobium (Nb), tungsten (W), magnesium (Mg), titanium (Ti), boron (B), molybdenum (Mo), scandium (Sc), and zirconium (Zr).

18. The cathode active material of claim 1, wherein the lithium transition metal oxide particles comprise a compound of Chemical Formula 1:

$$Li_{(1+a)}Ni_{(1-b-c)}Mn_{(b)}Co_{(c)}M'_{(s)}M''_{(v)}O_2 \qquad \text{<Chemical Formula 1>}$$

where M' comprises any one selected from the group consisting of Y, Zr, lanthanum (La), strontium (Sr), gallium (Ga), Mg, manganese (Mn), Ca, Sc, and Ni, or mixed elements of two or more thereof, M'' is at least one element of Ca, Nb, W, Mg, Ti, B, Mo, Sc, and Zr, and 0≤a<0.2, 0≤b≤1, 0≤c≤1, 0≤s≤0.2, and 0≤v≤0.2.

19. The cathode active material of claim 18, wherein, in Chemical Formula 1, M' comprises any one selected from the group consisting of Y, Zr, Ca, Sc, and Ni, or mixed elements of two or more thereof.

20. The cathode active material of claim 18, wherein s and v have a concentration gradient gradually decreasing from surfaces of the lithium transition metal oxide particles to inside thereof.

21. The cathode active material of claim 1, wherein an average particle diameter of the cathode active material is in a range of 3 μm to 30 μm.

22. The cathode active material of claim 1, wherein the cathode active material has a compressive strength of 80 MPa to 500 MPa under a pressure of 0.5 mN to 10 mN.

23. A method of preparing a cathode active material, the method comprising mixing lithium transition metal oxide particles and composite particles and heat treating the mixture, wherein the composite particles comprise any one selected from the group consisting of yttria stabilized zirconia (YSZ), gadolinia-doped ceria (GDC), lanthanum strontium gallate magnesite (LSGM), calcium (Ca)-doped zirconia or calcia stabilized zirconia (CSZ), scandium (Sc)-doped zirconia (SSZ), and nickel (Ni)—YSZ, or a mixture of two or more thereof.

24. The method of claim 23, wherein the composite particles comprise any one selected from the group consisting of YSZ, CSZ, and SSZ, or two or more thereof.

25. The method of claim 24, wherein the YSZ is $Zr_{(1-x)}Y_xO_{2-x/2}$ (0.01≤x≤0.30).

26. The method of claim 24, wherein the SSZ is $(ZrO_2)_{1-2x}(Sc_2O_3)_x$, $(ZrO_2)_{1-2x}(Sc_2O_3)_{x-z}(Y_2O_3)_z$, or $(ZrO_2)_{1-2x-z}(Sc_2O_3)_x(CeO_2)_z$ (0<x≤0.25) (0<z≤0.1), and the CSZ comprises CaO in an amount of 2 wt % to 17 wt % based on a total weight of the CSZ.

27. The method of claim 23, wherein the heat treatment is performed in a temperature range of 100° C. to 1,200° C.

28. The method of claim 27, wherein the heat treatment is performed in a temperature range of 100° C. to 600° C.

29. The method of claim 28, wherein a coating layer is formed on surfaces of the lithium transition metal oxide particles by the heat treatment, the coating layer comprises any one selected from the group consisting of YSZ, GDC, LSGM, CSZ, SSZ, and Ni—YSZ, or a mixture of two or more thereof, and the cathode active material comprises composite particles having a single-phase peak when analyzed by X-ray diffraction (XRD).

30. The method of claim 27, wherein the heat treatment is performed in a temperature range of 600° C. to 1,200° C.

31. The method of claim 30, wherein the composite particles are included in the lithium transition metal oxide particles by the heat treatment, and the composite particles comprise any one selected from the group consisting of YSZ, GDC, LSGM, CSZ, SSZ, and Ni—YSZ, or a mixture of two or more thereof.

32. The method of claim 23, wherein the lithium transition metal oxide particles are represented by Chemical Formula 1, and, in Chemical Formula 1, s and v have a concentration gradient gradually decreasing from surfaces of the lithium transition metal oxide particles to inside thereof:

$$Li_{(1+a)}Ni_{(1-b-c)}Mn_{(b)}Co_{(c)}M'_{(s)}M''_{(v)}O_2 \qquad \text{<Chemical Formula 1>}$$

where M' comprises any one selected from the group consisting of yttrium (Y), zirconium (Zr), lanthanum (La), strontium (Sr), gallium (Ga), magnesium (Mg), manganese (Mn), Ca, Sc, and Ni, or mixed elements of two or more thereof, M'' is at least one element of Ca, niobium (Nb), tungsten (W), magnesium (Mg), titanium (Ti), boron (B), molybdenum (Mo), Sc, and Zr, and 0≤a<0.2, 0≤b≤0.1, 0≤c≤1, 0≤s≤0.2, and 0≤v≤0.2.

33. The method of claim 23, wherein an average particle diameter (D50) of the composite particles is in a range of 5 nm to 500 nm.

34. The method of claim 23, wherein the composite particles are used in an amount of 50 ppm to 30,000 ppm.

35. The method of claim 23, wherein the mixing is dry mixing or wet mixing.

36. A cathode comprising the cathode active material of claim 1.

37. A lithium secondary battery comprising the cathode of claim 36.

* * * * *